(12) United States Patent
Konishi (10) Patent No.: US 7,626,631 B2
(45) Date of Patent: Dec. 1, 2009

(54) FOCUS CONTROL METHOD AND FOCUS CONTROL APPARATUS

(75) Inventor: Kazuki Konishi, Shinjuku-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/326,814

(22) Filed: Jan. 6, 2006

(65) Prior Publication Data

US 2006/0152617 A1 Jul. 13, 2006

(30) Foreign Application Priority Data

Jan. 7, 2005 (JP) ............................. 2005-003070

(51) Int. Cl.
G03B 13/00 (2006.01)
H04N 5/232 (2006.01)
G03B 17/00 (2006.01)
(52) U.S. Cl. ...................... 348/349; 348/345; 396/79
(58) Field of Classification Search ............... 348/347, 348/349, 354, 356; 369/79–83
See application file for complete search history.

(56) References Cited

U.S. PATENT DOCUMENTS

| 5,115,262 | A |   | 5/1992 | Komiyz |   |
|---|---|---|---|---|---|
| 5,402,174 | A | * | 3/1995 | Takahashi | 348/347 |
| 5,757,429 | A | * | 5/1998 | Haruki | 348/354 |
| 5,913,082 | A |   | 6/1999 | Onoda |   |
| 6,130,417 | A | * | 10/2000 | Hashimoto | 250/201.2 |
| 6,381,413 | B1 | * | 4/2002 | Harada | 396/80 |
| 6,781,633 | B2 | * | 8/2004 | Tanaka | 348/347 |
| 6,856,764 | B2 |   | 2/2005 | Higuma |   |
| 2001/0012074 | A1 | * | 8/2001 | Ohkawara | 348/358 |
| 2002/0154241 | A1 | * | 10/2002 | Ohkawara | 348/345 |
| 2003/0063212 | A1 | * | 4/2003 | Watanabe et al. | 348/349 |
| 2003/0193600 | A1 | * | 10/2003 | Kitamura et al. | 348/333.01 |
| 2004/0095504 | A1 | * | 5/2004 | Yasuda | 348/345 |
| 2004/0212721 | A1 | * | 10/2004 | Watanabe | 348/345 |

FOREIGN PATENT DOCUMENTS

| EP | 0 961 148 | 12/1999 |
|---|---|---|
| EP | 1 608 156 | 12/2005 |
| JP | 03-023412 A | 1/1991 |
| JP | 04-293006 A | 10/1992 |

(Continued)

OTHER PUBLICATIONS

Communication from the EPO dated Apr. 19, 2006 and European Search Report dated Mar. 27, 2006.

(Continued)

Primary Examiner—Sinh Tran
Assistant Examiner—Christopher K Peterson
(74) Attorney, Agent, or Firm—Canon U.S.A. Inc., I.P. Division (57) ABSTRACT

In a focus control method of acquiring focus information a plurality of times while moving a focus lens, and determining an in-focus position on the basis of the acquired focus information, whether the focus lens is to be moved toward the infinite end or the closest end is determined on the basis of a focus lens position, the focus information is acquired while moving the focus lens in the decided direction, the focus lens is stopped on the basis of the acquired focus information, and the focus lens is started from the stop position in a reverse direction.

8 Claims, 8 Drawing Sheets

FOREIGN PATENT DOCUMENTS

| | | |
|---|---|---|
| JP | 05-241066 | 9/1993 |
| JP | 06-141223 A | 5/1994 |
| JP | 09-069974 A | 3/1997 |
| JP | 2000-292683 A | 10/2000 |
| JP | 2002-048967 | 2/2002 |
| JP | 2002-072073 A | 3/2002 |
| JP | 2002-72074 | 3/2002 |
| JP | 2002-318341 A | 10/2002 |
| JP | 2003-241070 | 8/2003 |
| JP | 2003-295042 A | 10/2003 |
| JP | 2004-085837 A | 3/2004 |

OTHER PUBLICATIONS

Korean Office Action dated Mar. 31, 2007 and issued for Korean counterpart application No. 10-2006-0001689 (No English translation).

Japanese Office Action issued on Feb. 27, 2009 in counterpart foreign application No. 2006-003086.

* cited by examiner

FOCUS CONTROL METHOD AND FOCUS CONTROL APPARATUS

FIELD OF THE INVENTION

The present invention relates to a focus control method and focus control apparatus and, more particularly, to a focus control method and focus control apparatus which execute autofocus control by using an image signal acquired by an image sensing element that photoelectrically converts an object image formed by an image sensing optical system.

BACKGROUND OF THE INVENTION

Various proposals have been made conventionally to realize a high-velocity autofocus (AF) operation. For example, Japanese Patent Laid-Open No. 2002-72074 discloses a technique of speeding up autofocus control processing by determining the lens operation direction in focus control in accordance with the image sensing situation.

In this autofocus control processing, an AF search operation is performed in which while moving the focus lens during the shutter button being pressed halfway, image signals are obtained from the CCD at different positions, and an evaluation value is obtained on the basis of the contrast components of the acquired image signals. At this time, the focus position and zoom position are detected at the start of AF search operation. If the current focus position is located on the short distance side in the focus detection area, the direction from the closest distance to the infinite distance is determined as the search direction. On the other hand, if the current focus position is located on the long distance side in the focus detection area, the direction from the infinite distance to the closest distance is determined as the search direction. In addition, if the current zoom position is located on the wide-angle side, the search direction is set from the closest distance to the infinite distance. If the current zoom position is located on the telephoto side, the search direction is set from the infinite distance to the closest distance.

In the above-described prior art, the search direction is determined on the basis of the focus position and zoom position at the start of AF search operation. For this reason, search may be started from the closest distance side even when the object exists on the long distance side at a high probability.

Additionally, search is started always from the closest end or infinite end. Hence, when the object exists near the focus position at the start of AF search operation, focus lens movement and search operation are done needlessly, hindering speed-up of autofocus control processing.

SUMMARY OF THE INVENTION

The present invention has been made in consideration of the above situation, and has as its object to further speed up autofocus control processing.

According to the present invention, the foregoing object is attained by providing a focus control method of acquiring focus information a plurality of times while moving a focus lens, and determining an in-focus position on the basis of the acquired focus information comprising:

a decision step of, before determination processing of the in-focus position, deciding on the basis of a focus lens position whether the focus lens is to be moved toward an infinite end or a closest end;

a focus information acquisition step of acquiring the focus information while moving the focus lens in a direction decided in the decision step at a predetermined velocity; and a focusing step of, on the basis of the focus information acquired in the focus information acquisition step, stopping moving the focus lens on the basis of the focus information acquired in the focus information acquisition step and starting moving the focus lens from the stop position in a direction reverse to the moved direction of the focus lens in the focus information acquisition step.

According to another aspect of the present invention, the foregoing object is also attained by providing a focus control method of acquiring focus information a plurality of times while moving a focus lens, and determining an in-focus position on the basis of the acquired focus information comprising:

a decision step of, before determination processing of the in-focus position, deciding on the basis of a focus lens position whether the focus lens is to be moved toward an infinite end or a closest end;

a focus information acquisition step of acquiring the focus information while moving the focus lens in a direction decided in the decision step at a predetermined velocity; and a focusing step of, on the basis of the focus information acquired in the focus information acquisition step, moving the focus lens from one of an infinite end and a closest end.

In still another aspect of the present invention, the foregoing object is also attained by providing a focus control apparatus which has a focus information acquisition unit, causes the focus information acquisition unit to acquire focus information a plurality of times while moving a focus lens, and determines an in-focus position on the basis of the acquired focus information comprising:

a control unit that, before determination processing of the in-focus position, controls to decide on the basis of a focus lens position whether the focus lens is to be moved toward an infinite end or a closest end, cause the focus information acquisition unit to acquire the focus information while moving the focus lens in a determined direction at a predetermined velocity, stop moving the focus lens on the basis of the acquired focus information, and start moving the focus lens from the stop position in a direction reverse to the previous moving direction.

In still another aspect of the present invention, the foregoing object is also attained by providing a focus control apparatus which has a focus information acquisition unit, causes the focus information acquisition unit to acquire focus information a plurality of times while moving a focus lens, and determines an in-focus position on the basis of the acquired focus information comprising:

a control unit that, before determination processing of the in-focus position, controls to cause the focus information acquisition unit to acquire the focus information while moving the focus lens at a predetermined velocity on the basis of a focus lens position, and move the focus lens from one of an infinite end and a closest end.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

A preferred embodiment of the present invention will be described in detail in accordance with the accompanying drawings.

Figure 1:
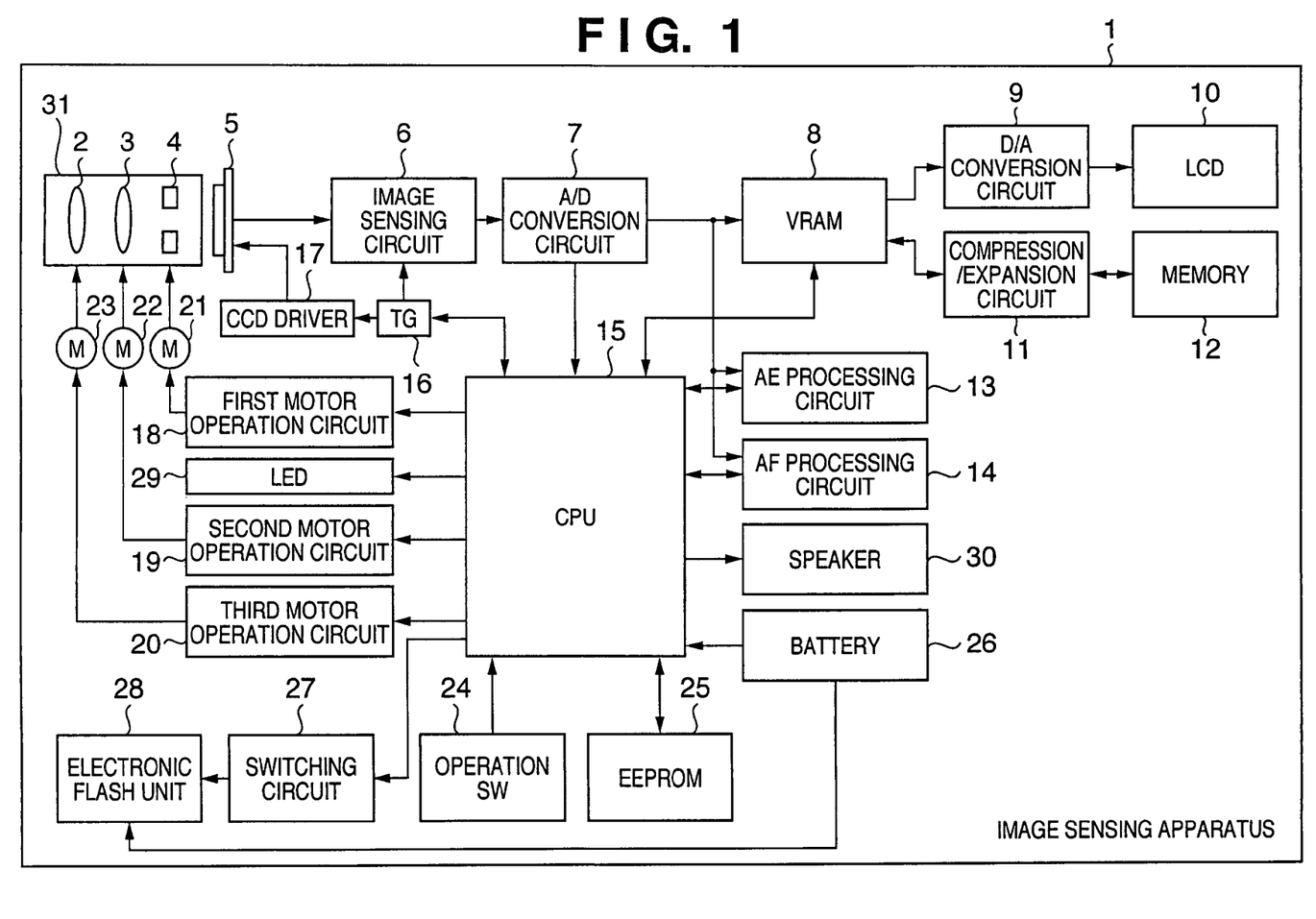
FIG. 1 is a block diagram showing a schematic arrangement of an image sensing apparatus according to an embodiment of the present invention.

FIG. 1 is a block diagram showing the arrangement of an image sensing apparatus according to the embodiment of the present invention. Referring to FIG. 1, reference numeral 1 denotes an image sensing apparatus; 2, a zoom lens group; 3, a focus lens group; and 4, an iris which controls the quantity of light that has passed through an image sensing optical system including the zoom lens group 2 and focus lens group 3 and also controls exposure to a solid-state image sensing element 5 (to be described later). An image sensing lens barrel 31 includes the zoom lens group 2, focus lens group 3, and iris 4. Reference numeral 5 denotes the solid-state image sensing element (to be referred to as a "CCD" hereinafter) represented by a CCD or CMOS sensor. An optical image of an object whose light amount is controlled by the iris 4 is formed on the light-receiving surface of the CCD 5. The CCD 5 photoelectrically converts the formed object image and outputs an electrical image signal.

An image sensing circuit 6 receives the image signal output from the CCD 5 and executes various kinds of image processing to generate a predetermined image signal. An A/D conversion circuit 7 converts the analog image signal generated by the image sensing circuit 6 into a digital image signal (image data). A memory (VRAM) 8 such as a buffer memory temporarily stores the image data output from the A/D conversion circuit 7. A D/A conversion circuit 9 reads out the image signal stored in the VRAM 8 and converts it into an analog image signal with a format suitable for playback display. An image display device (to be referred to as an "LCD" hereinafter) 10 such as a liquid crystal display device displays the analog image signal. When images obtained by the CCD 5 are sequentially displayed on the LCD 10 through the VRAM 8 and D/A conversion circuit 9 without storing the data in a memory 12 (to be described later), an electronic finder function can be implemented.

The memory 12 such as a semiconductor memory stores image data. A semiconductor memory such as a flash memory or a card- or stick-shaped flash memory that can be detached from the image sensing apparatus 1 is used as the memory 12. A magnetic storage medium such as a hard disk or Floppy Disk® or a memory in any other form can also be used.

A compression/expansion circuit 11 includes a compression circuit and expansion circuit. The compression circuit reads out image data temporarily stored in the VRAM 8 and executes compression processing or encoding processing to convert the data into a format suitable for storage in the memory 12. The expansion circuit executes decoding processing or expansion processing to covert the image data stored in the memory 12 into a format suitable for playback display. For example, when a playback switch (not shown) of operation switches 24 (to be described later) is operated to set an image sensing mode, and a release switch is operated to instruct an exposure/recording operation, the following processing is executed. First, image data temporarily stored in the VRAM 8 in the above-described way is compressed and encoded by the compression circuit of the compression/expansion circuit 11 and stored in the memory 12. When a playback mode is set, a playback operation is started, and the following processing is executed. The image data stored in the memory 12 is decoded and expanded by the expansion circuit of the compression/expansion circuit 11 and temporarily stored in the VRAM 8. The image data temporarily stored in the VRAM 8 is reproduced and displayed on the LCD 10 through the D/A conversion circuit 9 by the above-described processing.

A CPU 15 incorporating a memory for arithmetic processing controls the entire image sensing apparatus 1. An AE processing circuit 13 executes auto-exposure (AE) processing on the basis of the digital image signal output from the A/D conversion circuit 7. The AE processing circuit 13 calculates an AE evaluation value corresponding to the brightness of the object by executing arithmetic processing such as cumulative addition of the luminance values of received digital image signals of one frame. The AE evaluation value is output to the CPU 15.

An AF processing circuit 14 executes autofocus (AF) control processing on the basis of the digital image signal output from the A/D conversion circuit 7. The AF processing circuit 14 calculates an AF evaluation value corresponding to, e.g., the contour component amount on the high-frequency side by extracting the high-frequency component of input digital image signals of one frame through a high-pass filter (HPF) and executing arithmetic processing such as cumulative addition.

A timing generator (TG) 16 generates a predetermined timing signal. A CCD driver 17 operates the CCD 5. The TG 16 outputs the predetermined timing signal to the CPU 15, image sensing circuit 6, and CCD driver 17. The CPU 15 executes various kinds of control in synchronism with the timing signal. Upon receiving the timing signal from the TG 16, the image sensing circuit 6 executes various kinds of image processing such as chrominance signal separation in synchronism with the timing signal. Upon receiving the timing signal from the TG 16, the CCD driver 17 operates the CCD 5 in synchronism with the timing signal.

An iris operation motor 21 operates the iris 4. A first motor operation circuit 18 controls the operation of the iris operation motor 21. A focus operation motor 22 operates the focus lens group 3. A second motor operation circuit 19 controls the operation of the focus operation motor 22. A zoom operation motor 23 operates the zoom lens group 2. A third motor operation circuit 20 controls the operation of the zoom operation motor 23. The operation switches 24 include various kinds of switches.

The CPU 15 controls the first motor operation circuit 18, second motor operation circuit 19, and third motor operation circuit 20. Thus, the CPU 15 controls the operation of the iris 4, focus lens group 3, and zoom lens group 2 via the iris operation motor 21, focus operation motor 22, and zoom operation motor 23, respectively. More specifically, the CPU 15 executes AE control, in which the iris operation motor 21 is operated by controlling the first motor operation circuit 18 on the basis of the AE evaluation value calculated by the AE processing circuit 13, thereby adjusting the aperture amount of the iris 4 to an appropriate value. The CPU 15 also executes AF control, in which the focus operation motor 22 is operated by controlling the second motor operation circuit 19 on the basis of the AF evaluation value calculated by the AF processing circuit 14, thereby moving the focus lens group 3 to an in-focus position. When a zoom switch (not shown) of the operation switches 24 is operated, the CPU 15 executes a scaling operation (zoom operation) of the image sensing optical system, in which the zoom lens group 2 is moved by controlling the third motor operation circuit 20 to control the operation of the zoom operation motor 23.

The operation switches 24 include, e.g., a main power switch to activate the image sensing apparatus 1 and supply a power, a release switch to start the image sensing operation (storage operation), a playback switch to start the playback operation, and a zoom switch to change the zoom magnification, i.e., instruct to move the zoom lens group 2. In this embodiment, the release switch is a two-stroke switch having a first stroke (to be referred to as an "SW1" hereinafter) and second stroke (to be referred to as an "SW2" hereinafter). The SW1 generates an instruction signal to start AE processing and AF processing before the image sensing operation. The SW2 generates an instruction signal to start the exposure/recording operation of actually sensing and recording an image.

An EEPROM 25 is an electrically rewritable read-only memory and stores in advance programs to execute various kinds of control and data to be used to execute various kinds of operations. Reference numeral 26 denotes a battery; 28, an electronic flash unit; 27, a switching circuit to control light emission of the electronic flash unit 28; 29, an indicator such as an LED to indicate warning; and 30, a speaker to present guidance or warning by sound.

The image sensing operation of the image sensing apparatus 1 according to this embodiment will be described next with reference to the flowchart shown in FIG. 2.

When the main power switch of the image sensing apparatus 1 is ON, and the image sensing apparatus 1 is in the image sensing (recording) mode, an image sensing processing sequence is executed.

In step S1, the CPU 15 displays an optical image of an object, which is formed on the CCD 5 through the image sensing lens barrel 31, on the LCD 10 as an image through the image sensing circuit 6, A/D conversion circuit 7, VRAM 8, and D/A conversion circuit 9, as described above.

In step S2, the state of the release switch is confirmed. When the photographer operates the release switch, and the CPU 15 confirms that the SW1 is turned on, the flow advances to step S3 to execute normal AE processing. In step S4, AF processing is executed. In the AF processing, a position of the focus lens group 3 where the amount of the high-frequency component of the image signal obtained by the CCD 5 is maximized is obtained. The CPU 15 controls the focus operation motor 22 through the second motor operation circuit 19 to move the focus lens group 3 to the obtained position. The AF processing executed in step S4 will be described later in detail.

The result of the AF processing is examined. If the reliability is high, the user is notified in step S5 that the AF processing has been done successfully. If the reliability is low, the user is notified that the AF processing has failed. In the case of success, the notification is done by, e.g., lighting the indicator 29, displaying a green frame or message on the LCD 10, or generating sound from the speaker 30. In the case of failure, the notification is done by, e.g., blinking the indicator 29, displaying a yellow frame or message on the LCD 10, or generating sound from the speaker 30. The above-described notification methods and techniques are mere examples, and the present invention is not limited to those.

After predetermined AF processing is ended in this way, the CPU 15 confirms the SW2 in step S6. If the SW2 is OFF, the SW1 is confirmed in step S9. If the SW1 is also OFF, the flow returns to step S2. If the SW1 is ON, the flow returns to step S6 to confirm the SW2 again. If the SW2 is ON in step S6, the flow advances to step S7 to execute exposure processing to record the object image. In step S8, the image obtained by exposure is stored in the memory 12 through the CCD 5, image sensing circuit 6, A/D conversion circuit 7, VRAM 8, and compression/expansion circuit 11, as described above.

AF processing according to this embodiment, which is executed in step S4, will be described next in detail with reference to the flowchart in FIG. 3.

Figure 2:
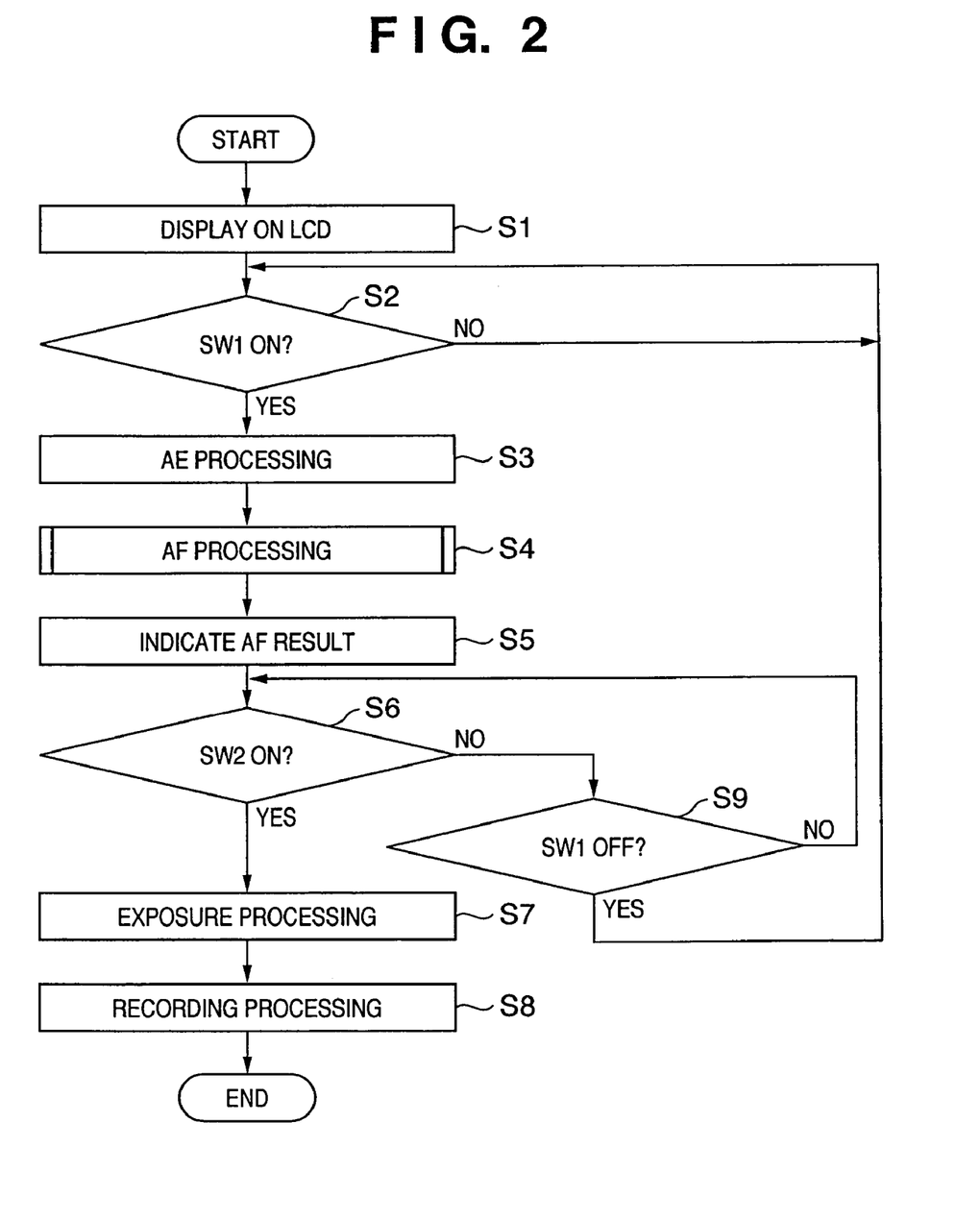
FIG. 2 is a flowchart for explaining processing in an image sensing mode according to the embodiment of the present invention.

First, the SW1 is turned on in step S2 in FIG. 2, and the AF processing starts in step S4. In step S401, the current position of the focus lens group 3 is acquired, and it is determined whether the focus lens group 3 is located on the infinite distance side or closest distance side with respect to a predetermined position. If the focus lens group 3 is located on the infinite distance side, the flow advances to step S402. If the focus lens group 3 is located on the closest distance side, the flow advances to step S421. The predetermined position serving as the criterion is set for each zoom position on the basis of a database called a photo space representing the probabilities that an object exists and that are classified by the focal length (image sensing field angle), luminance, and image sensing distance. How to determine the predetermined position will be described later in detail.

When the focus lens group 3 is located on the infinite distance side with respect to the predetermined position, in step S402, the focus lens group 3 is operated toward the infinite end, and the AF processing circuit 14 acquires AF evaluation values in the above-described manner. At this time, the AF evaluation values are acquired at a predetermined time interval while the focus operation motor 22 operates the focus lens group 3 at the possible maximum velocity. The processing of acquiring an AF evaluation value at the maximum velocity will be referred to as a "high-velocity AF operation" hereinafter. The AF evaluation values acquired by the high-velocity AF operation can be insufficient. In step S403, it is determined whether to stop moving the focus lens group 3. Every time a new AF evaluation value is acquired in step S402, it is compared with the previously acquired AF evaluation value. If the newly acquired AF evaluation value is smaller than the previous AF evaluation value by a predetermined amount, a decrementing counter is incremented. Otherwise, the decrementing counter is cleared. When the value of the decrementing counter has reached a predetermined value (predetermined count), it is determined that movement should be stopped. That is, in movement stop determination in step S403, it is determined whether the AF evaluation value has decreased by a predetermined amount continuously a predetermined number of times.

If it is determined on the basis of the result of movement stop determination in step S403 to stop movement (YES in step S404), the flow advances to step S405 to stop operating the focus lens group 3. Then, the flow advances to step S431.

Otherwise (NO in step S404), the flow advances to step S411 to determine whether the focus lens group 3 has reached the infinite end. If NO in step S411, the flow returns to step S402 to repeat the above-described processing. If YES in step S411, the flow advances to step S405 to stop operating the focus lens group 3. Then, the flow advances to step S431.

It may be determined in step S404 erroneously not to stop movement because the AF evaluation values acquired by the high-velocity AF operation are insufficient, as described above, when it must be determined actually that the movement should be stopped. Even if movement stop is erroneously determined, an AF evaluation value is acquired again at that position, as will be described later. For this reason, the in-focus position can always be detected, though the time required for the AF processing is long. Conversely, it must not be determined erroneously to stop movement when the movement should not be stopped. This is because the in-focus position cannot be detected.

To prevent the above-described latter determination error in step S403, the predetermined value to be compared with the decrease amount of the AF evaluation value is set relatively large, or the predetermined value (predetermined count) to be compared with the value of the decrementing counter is set relatively large. This also applies to an acceleration/deceleration operation. It is unnecessary to synchronize the AF evaluation value acquisition timing to the operation acceleration (deceleration) timing to accurately know the AF evaluation value acquisition position (focus lens position). When an AF evaluation value is to be acquired to accurately obtain a normal in-focus position, the AF evaluation value acquisition position must be known accurately. However, in the high-velocity AF operation, it is only necessary to determine whether an in-focus point is present. Hence, the operation velocity of the focus operation motor 22 may be changed by acceleration/deceleration of the motor during AF evaluation value acquisition.

When it is determined in step S401 that the focus lens group 3 is currently located on the closest distance side with respect to the predetermined position, the flow advances to step S421 to acquire AF evaluation values at a predetermined internal while executing the high-velocity AF operation toward the closest end.

In step S422, it is determined whether a peak is present. Every time a new AF evaluation value is acquired in step S421, it is compared with the previously acquired AF evaluation value. If the newly acquired AF evaluation value is larger than the previous AF evaluation value by a predetermined amount, the value of the decrementing counter is checked. If the value of the decrementing counter is 0, an incrementing counter is incremented. If the value of the decrementing counter is not 0, the incrementing counter is set to 1, and the decrementing counter is set to 0. If the AF evaluation value has decreased by the predetermined amount, the decrementing counter is incremented. The values of the incrementing counter and decrementing counter are checked. When the values of the two counters are equal to or larger than predetermined values (predetermined counts), it is determined that a peak is detected. That is, in peak presence/absence detection in step S422, it is determined whether the AF evaluation value has increased by a predetermined amount continuously a predetermined number of times and then decreased by a predetermined amount continuously a predetermined number of times.

If it is determined on the basis of the result of peak presence/absence determination in step S422 that a peak is present (YES in step S423), the flow advances to step S424 to set a peak detection flag. Then, the flow advances to step S425. Otherwise (NO in step S423), the flow directly advances to step S425.

Like the high-velocity AF operation to the infinite end, it may be determined in step S423 erroneously that no peak is present because the AF evaluation values acquired by the high-velocity AF operation are insufficient, when it must be determined actually that a peak is present. Even if peak detection is erroneously done, an AF evaluation value is acquired again at that position, as will be described later, like the operation to the infinite end. For this reason, the in-focus position can always be detected, though the time required for the AF processing is long. Conversely, it must not be determined erroneously that a peak is present when it must be determined that no peak is present. This is because the in-focus position cannot be detected.

To prevent the above-described latter determination error in step S422, for example, the predetermined value to be compared with the increase or decrease amount of the AF evaluation value is set relatively large, or the predetermined value (predetermined count) to be compared with the value of the incrementing or decrementing counter is set relatively large. This also applies to an acceleration/deceleration operation. It is unnecessary to synchronize the AF evaluation value acquisition timing to the operation acceleration (deceleration) timing to accurately know the AF evaluation value acquisition position (focus lens position).

In step S425, it is determined whether the focus lens group 3 has reached the closest end. If NO in step S425, the flow returns to step S421 to repeat the above-described processing. If YES in step S425, the flow advances to step S426 to stop operating the focus lens group 3. Then, the flow advances to step S431.

As described above, in this embodiment, first, the operation direction of the focus lens group 3 is determined. Then, the focus lens group 3 is operated at a high velocity toward the infinite end or closest end. In this high-velocity AF operation, AF evaluation values are acquired. It is detected on the basis of the acquired AF evaluation values whether a peak of the AF evaluation values exists obviously before reaching the normal AF operation start position (infinite end or closest end) of the focus lens group 3. If it is determined that a peak exists when the focus lens group 3 is being operated toward the infinite end, the operation is stopped immediately. When the focus lens group 3 is being operated toward the closest end, only that the peak is detected is stored without stopping the operation. The reason why the operation is stopped when the focus lens group 3 is being operated toward the infinite end is as follows. When an object is clearly present on the closest distance side of the point where the presence of the peak is determined, and far and near objects compete (i.e., when two peaks exist), the object on the closest distance side is set in focus in principle. Hence, in the operation toward the infinite end, even when the object is present on the infinite distance side, its in-focus position need not be obtained.

Conversely, in operating the focus lens group 3 toward the closest end, even when it is determined that a peak exists, another object may be present on the closest distance side of that position. Hence, the presence/absence of another object must be checked. To do this, only that the peak is detected is stored, and the operation of the focus lens group 3 is continued to the closest end. When it is determined that a peak is present, the operation range of the focus lens group 3 from the closest end can be limited. Hence, only whether a peak is detected is stored.

In step S431, the zoom position and peak detection flag are checked. When the zoom position is on the WIDE side with respect to a predetermined position, or the peak detection flag is set, the flow advances to step S432. Otherwise, i.e., when the zoom position is on the TELE side with respect to the predetermined position, and no peak detection flag is set, the flow advances to step S441.

In step S432, AF evaluation values are acquired at an operation interval of the focus lens group 3, which is about 3 to 5 times as large as the depth of image plane. This processing will be referred to as "rough scan" hereinafter. The operation interval of rough scan is narrower than that of the high-velocity AF operation. In this embodiment, the time interval of obtaining the AF evaluation value is kept the same for rough scan and the high-speed AF operation, but the focus lens group 3 is moved slower in rough scan than in high-velocity AF scan.

The flow advances to step S432 in the following three cases.

1) The high-velocity AF operation is executed toward the infinite end, and it is determined that the zoom position is on the WIDE side.

2) The high-velocity AF operation is executed toward the closest end, and it is determined that the zoom position is on the WIDE side, although no peak detection flag is set.

3) The high-velocity AF operation is executed toward the closest end, and the peak detection flag is set.

In case 1), rough scan is executed from the infinite end or the position where the focus lens group 3 is stopped in step S404. In case 2), rough scan is executed from the closest end until a peak is detected. In case 3), rough scan is executed from the closest end to a position spaced apart from the peak detection position by a predetermined interval toward the infinite end. In step S433, an in-focus position is obtained from the AF evaluation values acquired in step S432, the focus lens group 3 is operated to the in-focus position, and the flow advances to step S5 in FIG. 2.

In step S441, AF evaluation values are acquired at an operation interval of the focus lens group 3, which is about 10 times as large as the depth of focus. This processing will be referred to as "coarse scan" hereinafter. The operation interval of coarse scan is narrower than that of the high-velocity AF operation and wider than that of rough scan. In this embodiment, the time interval of obtaining the AF evaluation value is kept the same for course scan and the high-speed AF operation, but the focus lens group 3 is moved slower in coarse scan than in high-velocity AF scan and faster in coarse scan than in rough scan.

In this case, since the operation interval to acquire the AF evaluation values is very wide, AF can be executed at a higher velocity than rough scan, though the focus accuracy poses a problem. Hence, after coarse scan, the operation needs to be performed again at a finer interval. The operation interval at that time is 1 to 2 times as large as the depth of focus depending on the focal length. This operation will be called an "adjusting operation" in which AF evaluation values are acquired at the operation interval. The flow advances to step S441 in the following two cases.

1) The high-velocity AF operation is executed toward the infinite end, and it is determined that the zoom position is on the TELE side.

2) The high-velocity AF operation is executed toward the closest end, no peak detection flag is set, and it is determined that the zoom position is on the TELE side.

In case 1), coarse scan is executed from the infinite end or the position where the focus lens group 3 is stopped in step S404. In case 2), coarse scan is executed from the closest end until a peak is detected. In step S442, a temporary in-focus position is obtained from the AF evaluation values acquired by coarse scan. The method of obtaining the in-focus position is the same as in rough scan. If the reliability of AF evaluation values is low at this stage, AFNG is displayed in step S5 in FIG. 2. In this case, processing from step S443 is not executed, although not illustrated in FIG. 3.

If the reliability of the AF evaluation values is high, and the temporary in-focus position is obtained in step S442, the focus lens group 3 is operated to an adjustment operation start position shifted from the temporary in-focus position by a predetermined amount in step S443. In step S444, the adjustment operation is executed. In step S445, the in-focus position is obtained from acquired AF evaluation values, and the focus lens group 3 is operated to that position.

As described above, when no peak detection flag is set, and the zoom position is on the TELE side, AF processing can be executed at a higher velocity by performing coarse scan.

Figure 3:
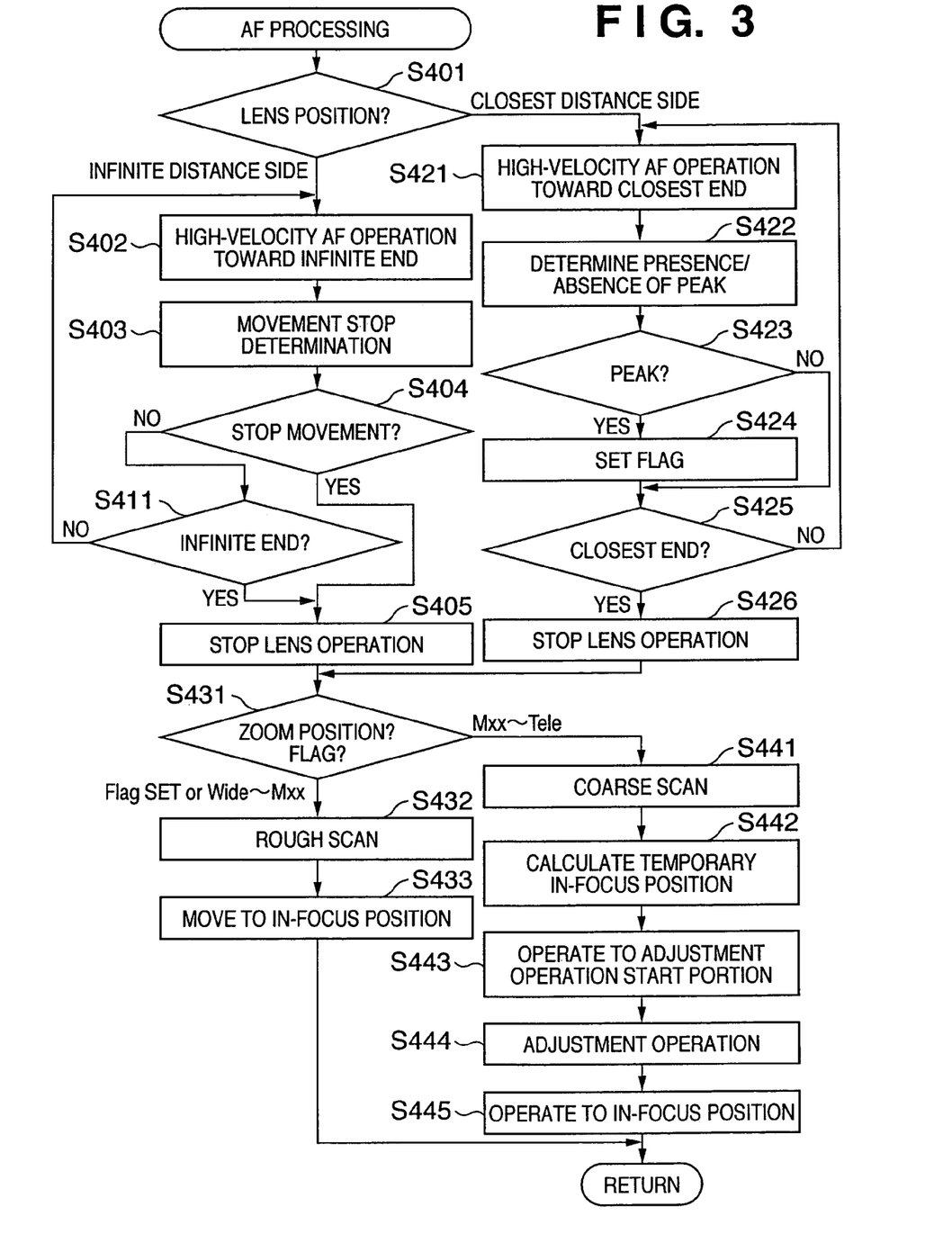
FIG. 3 is a flowchart showing AF processing procedures according to the embodiment of the present invention.
Figure 4:
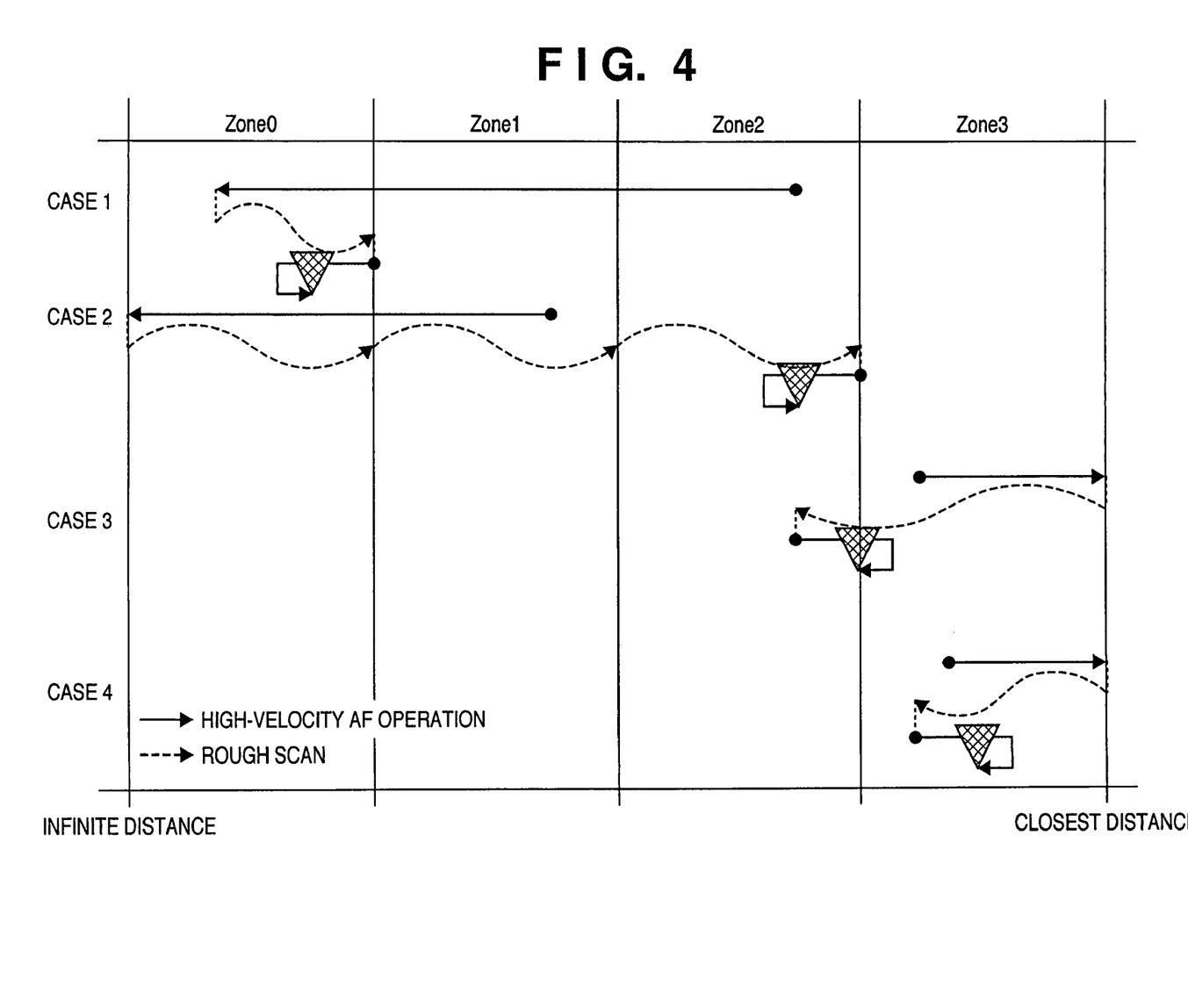
FIG. 4 is a view showing the movement of a focus lens when AF processing shown in FIG. 3 is executed.
Figure 5:
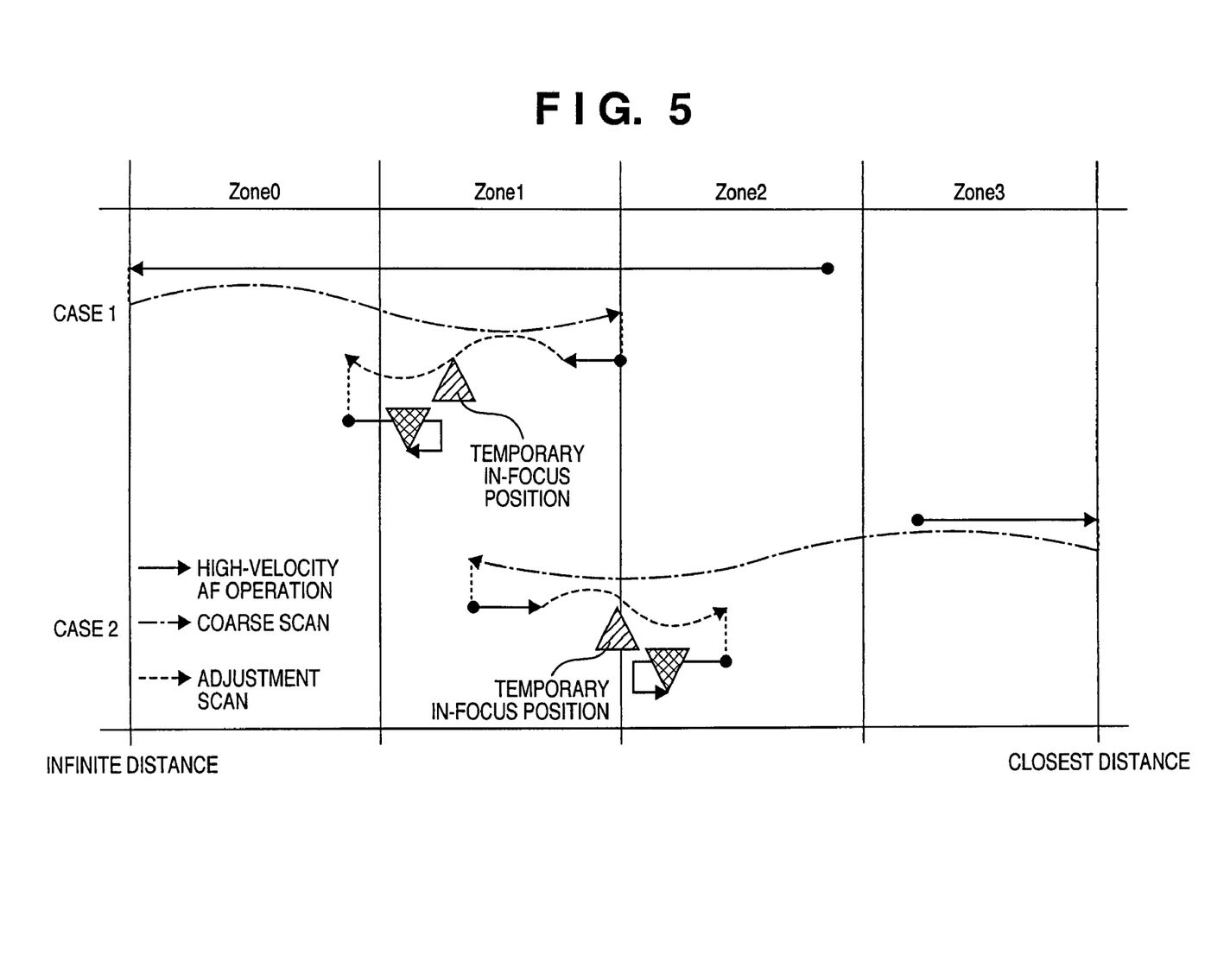
FIG. 5 is a view showing the movement of the focus lens when AF processing shown in FIG. 3 is executed.
Figure 6:
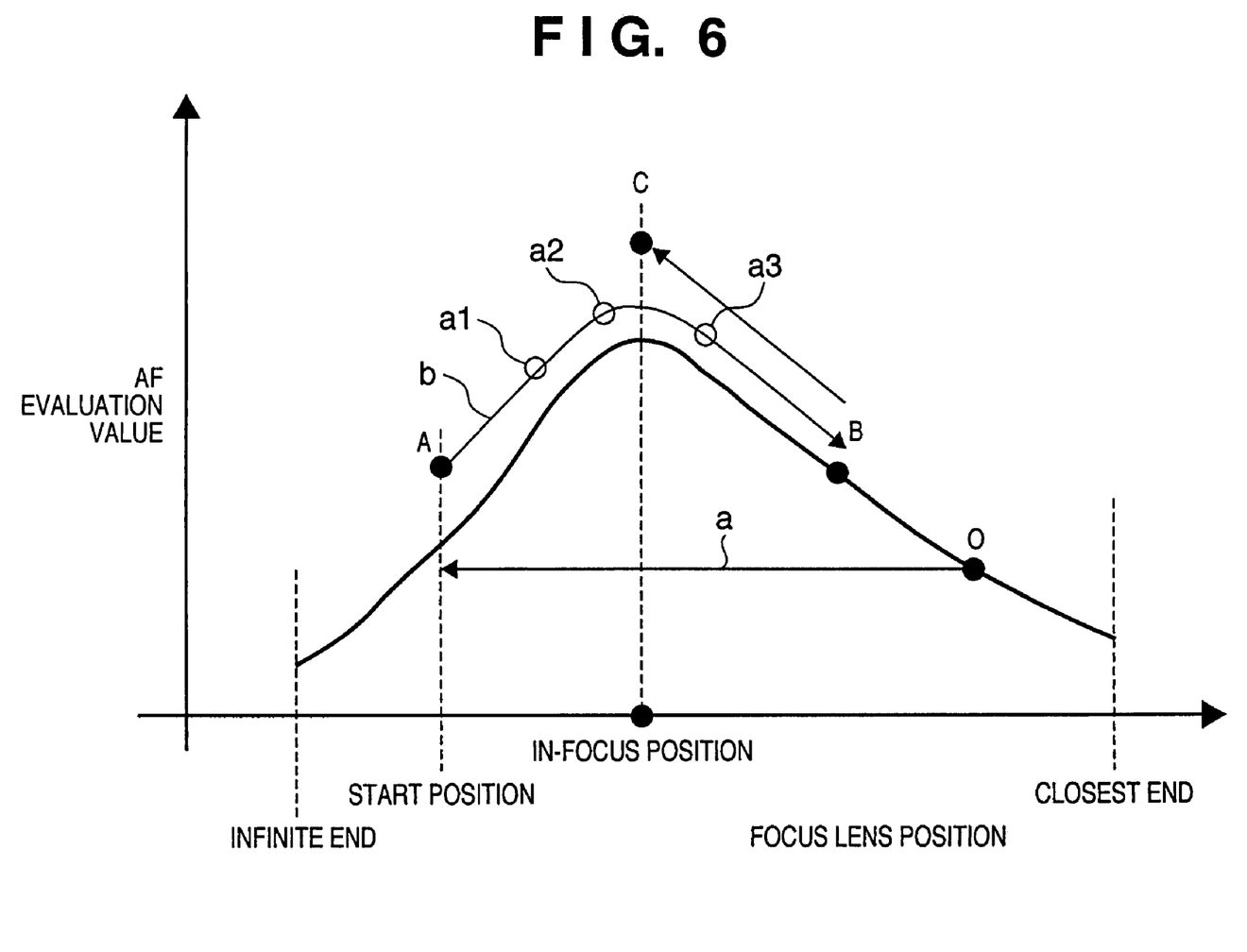
FIG. 6 is a view showing the relationship between the focus lens movement and an AF evaluation value in case 1 in FIG. 4.

The outline of movement of the focus lens group 3 when AF processing as shown in the flowchart of FIG. 3 is executed will be described next with reference to FIGS. 4 to 6. In FIGS. 4 and 5, the movable range of the focus lens group 3 is divided into Zone0 to Zone3 sequentially from the infinite distance to the closest distance for the descriptive convenience. The predetermined position to be used to determine in step S401 whether the focus lens group should be operated toward the closest end or infinite end is located at the boundary between Zone2 and Zone3.

FIG. 4 shows an operation corresponding to the processing in steps S432 and S433. Cases 1 and 2 show that the high-velocity AF operation is executed toward the infinite end, and the zoom position is on the WIDE side. Case 3 shows that the high-velocity AF operation is executed toward the closest end, and the zoom position is on the WIDE side, although no peak is detected. Case 4 shows that the high-velocity AF operation is executed toward the closest end, and a peak is detected.

Case 1 will be described also with reference to FIG. 6. Assume that the focus lens group 3 is in Zone2 at first, and the object is present in Zone0. The focus lens group 3 is located (position "○" in FIG. 6) on the infinite distance side (in the range from Zone0 to Zone2) with respect to the predetermined position. Hence, the focus lens group 3 is first operated toward the infinite end by the high-velocity AF operation ("a" in FIG. 6). When the peak of AF evaluation values is detected, the focus lens group 3 is stopped (position "A" in FIG. 6). Since the zoom position is on the WIDE side, rough scan is executed from the stop position toward the closest end ("b" in FIG. 6). In case 1, the object is present in Zone0, as described above. In this case, rough scan may be executed until the end (position "B" in FIG. 6) on the closest distance side of Zone0. Alternatively, rough scan may be executed in a predetermined range after the peak of AF evaluation values is detected. Rough scan may be continued to the closest end to detect another object on the closest distance side.

A position ("C" in FIG. 6) where the AF evaluation value is maximized is obtained from the output (AF evaluation value) from the AF processing circuit 14, which is acquired by rough scan. The focus lens group 3 is operated to that position.

In this embodiment, an AF evaluation value is not always acquired at the operation interval of the focus lens group 3. Instead, AF evaluation values are acquired while appropriately skipping the operation interval of the focus lens group 3. Hence, AF evaluation values may not be acquired at points a1, a2, and a3 shown in FIG. 6 although no AF evaluation value is acquired at the in-focus position C. In this case, the in-focus position "C" is calculated from the point where the AF evaluation value is maximized and the AF evaluation values at points before and after the point.

Before interpolation is executed to obtain the point (position "C" in FIG. 6) where the AF evaluation value is maximized, the reliability of AF evaluation values is evaluated. If the reliability is sufficiently high, the point where the AF evaluation value is maximized is obtained, and AFOK is displayed in step S5 in FIG. 2. If the evaluated reliability of the AF evaluation values is low, AFNG is displayed in step S5 in FIG. 2 without obtaining the point where the AF evaluation value is maximized.

In case 1, if no peak of AF evaluation values corresponding to the object is detected during the high-velocity AF operation because of, e.g., low contrast of the object, the focus lens group 3 is operated to a position corresponding to the infinite distance. Then, scan is executed from that position to the closest distance side.

Case 2 in FIG. 4 will be described next. In this case, assume that the focus lens group 3 is in Zone1 at first, and the object is present in Zone2. The focus lens group 3 is located on the infinite distance side (in the range from Zone0 to Zone2) with respect to the predetermined position. Hence, the focus lens group 3 is first operated toward the infinite end by the high-velocity AF operation. During this high-velocity AF operation, no peak of AF evaluation values corresponding to the object is detected. Hence, the focus lens group 3 is operated to the infinite end. Since the zoom position is on the WIDE side, rough scan is executed from the infinite end toward the closest end. In case 2, the object is present in Zone2, as described above. Hence, rough scan may be executed until the end of Zone2. Even in this case, rough scan may be further continued for a predetermined range after the peak of AF evaluation values is detected, or rough scan may be continued to the closest end to detect another object on the closest distance side, as in case 1.

A position where the AF evaluation value is maximized is obtained from the output (AF evaluation value) from the AF processing circuit 14, which is acquired by rough scan. The focus lens group 3 is operated to that position.

Case 3 in FIG. 4 will be described next. In this case, assume that the focus lens group 3 is in Zone3 at first, and the object is present in Zone2. The focus lens group 3 is located on the closest distance side (in Zone3) with respect to the predetermined position. Hence, the focus lens group 3 is first operated toward the closest end by the high-velocity AF operation. During this high-velocity AF operation, no peak of AF evaluation values corresponding to the object is detected. Hence, no peak detection flag is set, and the focus lens group 3 is operated to the closest end. Since the zoom position is on the WIDE side, rough scan is executed from the closest end toward the infinite end. In case 3, rough scan is executed until the peak of AF evaluation values corresponding to the object is detected.

A position where the AF evaluation value is maximized is obtained from the output (AF evaluation value) from the AF processing circuit 14, which is acquired by rough scan. The focus lens group 3 is operated to that position.

Case 4 in FIG. 4 will be described next. In this case, assume that the focus lens group 3 is in Zone3 at first, and the object is present on the closest distance side of the focus lens group 3. The focus lens group 3 is located on the closest distance side (in Zone3) with respect to the predetermined position. Hence, the focus lens group 3 is first operated toward the closest end by the high-velocity AF operation. During this high-velocity AF operation, a peak of AF evaluation values corresponding to the object is detected. Hence, the peak detection flag is set, and the focus lens group 3 is operated to the closest end. In this case, since the peak detection flag is set, rough scan is executed from the closest end toward the infinite end independently of the zoom position. In case 4, rough scan is executed until the vicinity of the peak of AF evaluation values nearest to the closest end, which is detected by the high-velocity AF operation.

A position where the AF evaluation value is maximized is obtained from the output (AF evaluation value) from the AF processing circuit 14, which is acquired by rough scan. The focus lens group 3 is operated to that position.

In case 4, if peak detection has failed, no peak detection flag is set, and the focus lens group 3 is operated up to the closest end by the high-velocity AF operation. In this case, if the zoom position is on the WIDE side, the above-described control in case 3 is executed. If the zoom position is on the TELE side, control to be described later is executed with reference to that in case 2 in FIG. 5.

The movement of the focus lens corresponding to the processing in steps S441 to S445 will be described next with reference to FIG. 5. In FIG. 5, the zoom position is on the TELE side of the predetermined value.

In case 1 shown in FIG. 5, assume that the focus lens group 3 is in Zone2 at first, and the object is present in Zone1. The focus lens group 3 is located on the infinite distance side (in the range from Zone0 to Zone2) with respect to the predetermined position. Hence, the focus lens group 3 is first operated toward the infinite end by the high-velocity AF operation. If no peak of AF evaluation values corresponding to the object is detected during the high-velocity AF operation because of, e.g., the wide scan interval, the focus lens group 3 is operated to the infinite end. Since the zoom position is on the TELE side, coarse scan is executed from the infinite end toward the closest end. In case 1, the object is present in Zone2, as described above. In this case, coarse scan is executed until the termination of Zone2. However, rough scan may be further continued for a predetermined range after the peak of AF evaluation values is detected, or rough scan may be continued to the closest end to detect another object on the closest distance side, as described above.

A position where the AF evaluation value is maximized is obtained from the output (AF evaluation value) from the AF processing circuit 14, which is acquired by coarse scan, and the position is defined as a temporary in-focus position. A position shifted from the temporary in-focus position to the closest distance side (the side where the focus lens group 3 is present at the end of coarse scan) by a predetermined range determined on the basis of the focal length is set as the adjustment scan start position. The focus lens group 3 is operated to the position, and adjustment scan is executed.

A position where the AF evaluation value is maximized is obtained from the adjustment scan result. The focus lens group 3 is operated to that position.

In case 1, the object is present in Zone1. The same operation is executed even when the object is in Zone3. When the peak of AF evaluation values corresponding to the object in Zone1 is detected during the high-velocity AF operation, the focus lens group 3 stops at that position without being operated to the infinite end. Then, coarse scan is executed from the stop position toward the closest end.

In case 2 shown in FIG. 5 will be described next. In this example, assume that the focus lens group 3 is in Zone3 at first, and the object is present in Zone1. The focus lens group 3 is located on the closest distance side (Zone3) with respect to the predetermined position. Hence, the focus lens group 3 is first operated toward the closest end by the high-velocity AF operation. No peak of AF evaluation values corresponding to the object is detected during the high-velocity AF operation. Hence, no peak detection flag is set, and the focus lens group 3 is operated to the closest end. Since no peak detection flag is set, and the zoom position is on the TELE side of the predetermined value, coarse scan is executed from the closest end toward the infinite end. In case 2, coarse scan is executed until the peak of AF evaluation values corresponding to the object is detected.

A position where the AF evaluation value is maximized is obtained from the output (AF evaluation value) from the AF processing circuit 14, which is acquired by coarse scan, and the position is defined as a temporary in-focus position. A position shifted from the temporary in-focus position to the infinite distance side (the side where the focus lens group 3 is present at the end of coarse scan) by a predetermined range determined on the basis of the focal length is set as the adjustment scan start position. The focus lens group 3 is operated to the position, and adjustment scan is executed.

A position where the AF evaluation value is maximized is obtained from the adjustment scan result. The focus lens group 3 is operated to that position.

A method of determining the predetermined position (threshold value) to be used to determine in step S401 of this embodiment whether the focus lens should be operated toward the infinite end or closest end will be described next.

In this embodiment, the predetermined value for each zoom position is set on the basis of a database called a photo space representing the probabilities that an object exists and that are classified by the focal length (image sensing field angle), luminance, and image sensing distance.

Figure 7:
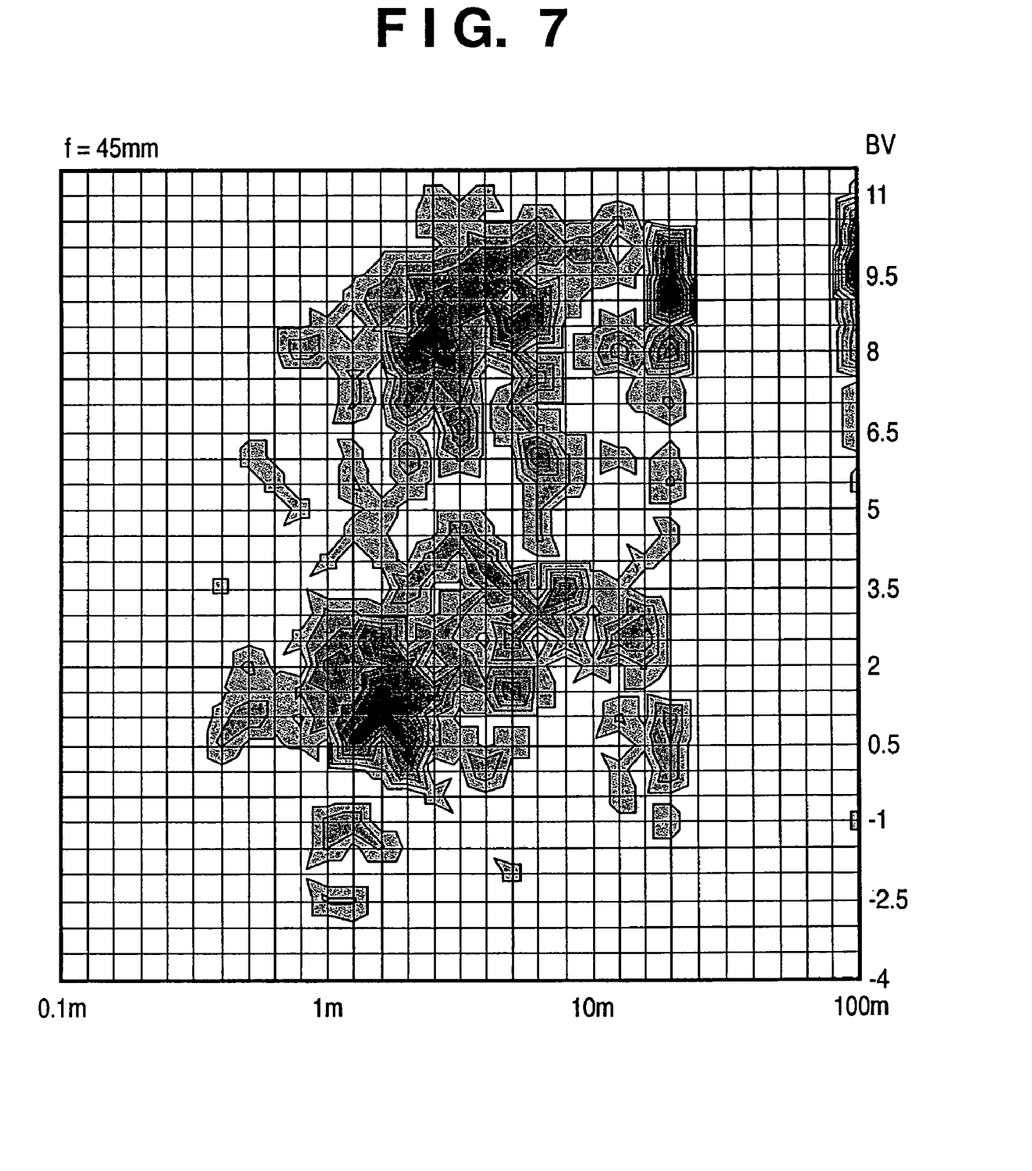
FIG. 7 is an explanatory view of a photo space.
Figure 8:
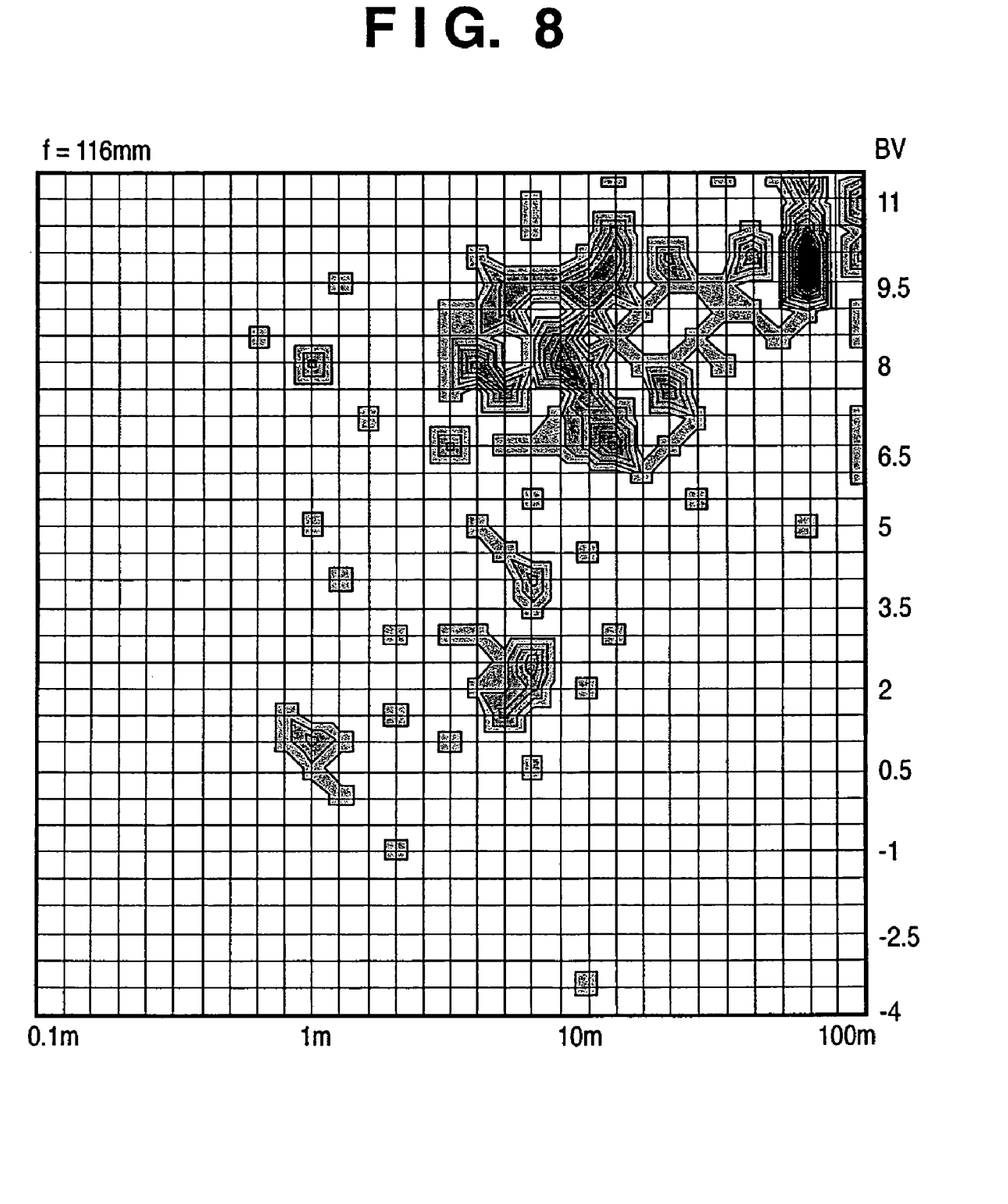
FIG. 8 is an explanatory view of a photo space.

FIGS. 7 and 8 are views showing an example of the photo space.

FIG. 7 shows the object existence probabilities with respect to the luminance and object distance when f=45 mm, and FIG. 8 shows the object existence probabilities when f=116 mm. As is apparent from the existence probabilities shown in FIGS. 7 and 8, an object in the infinite distance is often sensed when it is bright. However, the object position changes depending on the focal length when it is dark. When f=45 mm, objects are distributed in a range from about 50 cm to several ten m. When f=116 mm, objects concentrate near 3 m.

Generally speaking, the operation start position of the focus lens group 3 is preferably determined such that an AF evaluation value in the range where the object existence probability is high is quickly obtained from the infinite side when it is bright or depending on the focal length when it is dark.

In the present invention, according to the above-described idea, which one of the infinite end and closest end is to be used as the start position of rough scan or coarse scan, i.e., the threshold value for determining the direction of high-velocity AF operation is determined for each focal length (zoom position) and luminance.

An example of the threshold value when the focal length for a 35-mm film camera is defined as f will be described below.

|  | In Bright State (Bv > 4) | In Dark State (Bv ≦ 4) |
|---|---|---|
| f ≦ 28 mm | position corresponding to 90 cm | position corresponding to 100 cm |
| 28 mm < f ≦ 70 mm | position corresponding to 80 cm | position corresponding to 100 cm |
| 70 mm < f ≦ 140 mm | position corresponding to 62.5 cm | position corresponding to 100 cm |
| 140 mm < f ≦ 200 mm | position corresponding to 125 cm | position corresponding to 200 cm |
| 200 mm < f | position corresponding to 120 cm | position corresponding to 200 cm |

In this example, the closest image sensing distance is 50 cm until f=140 mm, or 1 m when the focal length is longer.

As is apparent from this example, in short focus, an object at the short distance is sensed at a high probability. Hence, the threshold value is set on the infinite distance side as compared to long focus. When it is dark, image sensing with electronic flash or image sensing of a night scene is mainly done. Hence, the image sensing distance is limited to the range (2 to 3 m) that light from the electronic flash can reach or a long distance. Hence, the threshold value is set on the infinite distance side as compared to when it is bright.

In the above-described embodiment, the image sensing apparatus 1 senses an image by using a solid-state image sensing element. However, the present invention can also be applied to an image sensing apparatus using a silver halide film. In this case, an arrangement capable of acquiring an AF evaluation value for focus control is separately provided.

In the above description, when a plurality of objects are present, focus is placed on the closest object. However, the present invention is not limited to this. The object distance for focusing with priority may be selected in accordance with the image sensing mode. For example, to adjust the focus to a farther object with priority, control in operation toward the infinite end and closest end in the processing shown in FIG. 3 is reversed to the above description.

Other Embodiments

The invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-003070 filed on Jan. 7, 2005 which is hereby incorporated by reference herein in its entirety.

What is claimed is:

1. A focus control method of acquiring focus information a plurality of times while moving a focus lens, and determining an in-focus position on the basis of the acquired focus information comprising:

a decision step determined by a control unit of, before acquiring focus information, deciding on the basis of a focus lens position whether the focus lens is to be moved toward an infinite end or a closest end;

a focus information acquisition step determined by a control unit of acquiring the focus information while moving the focus lens in a direction decided in the decision step at a first predetermined velocity;

a determination step determined by a control unit of determining whether the focus lens has passed an in-focus position or not on the basis of the focus information acquired in the focus information acquisition step; and a focusing step determined by a control unit of stopping moving the focus lens and starting moving the focus lens from the stop position in a direction reverse to the moved direction of the focus lens in the focus information acquisition step at a second predetermined velocity which is slower than said first predetermined velocity while maintaining timing of acquiring the focus information, wherein, in the focusing step, if it is determined that the focus lens has passed the in-focus position while moving toward the infinite end, the focus lens is immediately stopped, and if it is determined that the focus lens has passed the in-focus position while moving toward the closest end, the focus lens is stopped when the focus lens reaches the closest end.

2. A focus control apparatus which has a focus information acquisition unit, causes said focus information acquisition unit to acquire focus information a plurality of times while moving a focus lens, and determines an in-focus position on the basis of the acquired focus information comprising:

a control unit that, before acquiring focus information, controls to decide on the basis of a focus lens position whether said focus lens is to be moved toward an infinite end or a closest end, cause said focus information acquisition unit to acquire the focus information while moving said focus lens in a determined direction at a first predetermined velocity, determine whether the focus lens has passed an in-focus position or not on the basis of the acquired focus information, stop moving said focus lens and start moving the focus lens from the stop position in a direction reverse to the previous moving direction at a second predetermined velocity which is slower than said first predetermined velocity while maintaining timing of acquiring the focus information, wherein if it is determined that the focus lens has passed the in-focus position while moving toward the infinite end, the focus lens is immediately stopped, and if it is determined that the focus lens has passed the in-focus position while moving toward the closest end, the focus lens is stopped when the focus lens reaches the closest end.

3. The apparatus according to claim 2, wherein said control unit sets a predetermined position in accordance with at least one of a zoom lens position and an object luminance, decides to move said focus lens toward the infinite end when said focus lens is located on an infinite distance side with respect to the predetermined position, or decides to move said focus lens toward the closest end when said focus lens is located on a closest distance side with respect to the predetermined position.

4. The apparatus according to claim 3, wherein when the object luminance is brighter than a predetermined luminance, the predetermined position is set on the closest distance side as compared to a case wherein the object luminance is dark.

5. The apparatus according to claim 3, wherein when the zoom lens position is located on a wide-angle side, the predetermined position is set on the infinite distance side as compared to a case wherein the zoom lens position is located on a telephoto side.

6. The apparatus according to claim 2, wherein said control unit decides on the basis of a zoom lens position whether said focus lens is to be moved at a first velocity or a second velocity faster than the first velocity when acquiring focus information.

7. A computer-readable storage medium storing computer program codes realizing a focus control method comprising:

a decision step of, before acquiring focus information, deciding on the basis of a focus lens position whether the focus lens is to be moved toward an infinite end or a closest end;

a focus information acquisition step of acquiring the focus information while moving the focus lens in a direction decided in the decision step at a first predetermined velocity;

a determination step of determining whether the focus lens has passed an in-focus position or not on the basis of the focus information acquired in the focus information acquisition step; and a focusing step of stopping moving the focus lens and starting moving the focus lens from the stop position in a direction reverse to the moved direction of the focus lens in the focus information acquisition step at a second predetermined velocity which is slower than said first predetermined velocity while maintaining timing of acquiring the focus information, wherein, in the focusing step, if it is determined that the focus lens has passed the in-focus position while moving toward the infinite end, the focus lens is immediately stopped, and if it is determined that the focus lens has passed the in-focus position while moving toward the closest end, the focus lens is stopped when the focus lens reaches the closest end.

8. An image sensing apparatus comprising:
a focus control apparatus according to claim 2; and
an image sensing element.

* * * * *